United States Patent Office 3,015,894
Patented Jan. 9, 1962

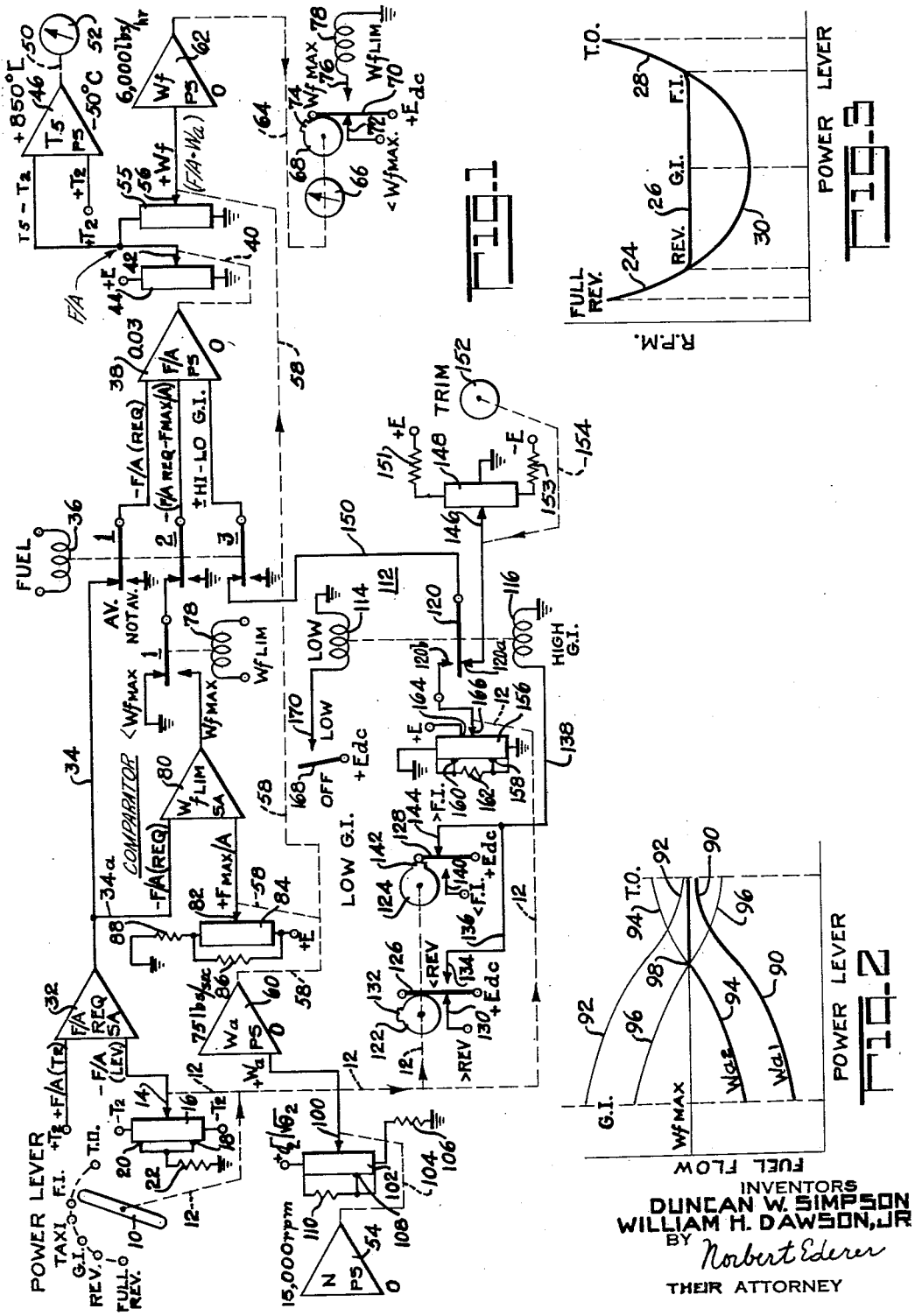

3,015,894
SIMULATED TURBINE SYSTEM FOR TURBO-PROPELLER AIRCRAFT
Duncan W. Simpson, Wyckoff, and William H. Dawson, Jr., Waldwick, N.J., assignors to Curtiss-Wright Corporation, a corporation of Delaware
Filed Mar. 17, 1959, Ser. No. 800,009
14 Claims. (Cl. 35—12)

This invention relates to grounded aircraft trainers, and more particularly to simulation of the engine system of so-called turbo propeller aircraft.

The present application is related to a co-pending application of Robert F. A. Lem for "Aircraft Training Apparatus for Simulating the Turbine System of Turbo Propeller Aircraft," Serial No. 700,407 filed December 3, 1957, now Patent No. 2,940,181, dated June 14, 1960. The Lem patent is directed to the simulation of the turbine system of the U.S. military C–130 type aircraft. The C–130 is characterized by a power lever that is operable by the pilot within two ranges, namely a ground or "beta" range, and a flight range. The instant position of the power lever determines the rate of fuel flow to the turbine and thus provisionally determines the turbine inlet temperature. Means are provided for measuring the actual turbine inlet temperature and provide a corresponding error signal for a servo mechanism which controls a fine fuel flow control, that trims the fuel flow to the rate required to maintain the temperature dictated by the power lever position. Accordingly the turbine system operates as a "temperature-limited" system.

In the U.S. military type C–133 aircraft there is also provided a power lever operable in similar fashion, but by way of contrast the fuel flow rate follows the power lever position in a predetermined relation up to a maximum limit of approximately 3850 lbs. per hour, and remains constant thereat in spite of any attempts further to increase. The turbine inlet temperature is permitted to vary in accordance with the fuel air ratio available at the inlet to the turbine.

The power lever, preparatory to take-off is maintained in a so-called ground-idle position, and this may arbitrarily be designated as the mid-point of a ground-idle range, whose limits are at one end a "reverse" position and at its other, a "flight-idle" position. The ground-idle range thus encompasses a portion of the ground range and a relatively small portion of the flight range of the power lever. It is a characteristic feature of the C–133 aircraft to afford, at the option of the pilot a high and a low ground-idle range. Ordinary operation of the power lever will result in the high ground-idle range of turbine r.p.m. If at any instant the power lever is within the ground-idle range, and the pilot operates a momentary push button type low ground-idle selector switch, the turbine r.p.m. will be reduced as dictated by the low ground-idle range requirements. The limits of the high and low ground-idle ranges are coincident so that when the power lever is operated beyond flight-idle towards take-off, and at a later time is pushed back past flight-idle into the ground-idle range, operation will be in the high ground-idle range once more. Similarly again assuming selection of the ground-idle range, operation of the power lever beyond reverse towards full reverse, and subsequent retraction past reverse into the ground-idle range will obtain high ground-idle operation once more.

It is a principal object of the invention realistically to simulate the performance of the engine system of a turbo-prop aircraft that is characterized by a maximum limit for rate of fuel flow.

Another object of the invention is realistic simulation of the high and low ground-idle operational modes. Other objects, advantages and novel features will be apparent as the description proceeds. The present invention, although especially suited for simulation of turbo propeller aircraft, is applicable also to simulation of engine system for turbo-jet or reciprocating engine type aircrafts. The limiter system described hereinafter with reference to limiting the fuel flow to a predetermined maximum value, is, to our knowledge novel and of utility in the more general computer art.

The invention will be more fully set forth in the following description referring to the accompanying drawing and the features of novelty will be pointed out with particularity in the claims annexed to and forming a part of this specification.

In the drawings:

FIG. 1 is a diagrammatic representation of a simulated turbine system in accordance with a preferred embodiment of the invention;

FIG. 2 is a graph of the relation of fuel flow with changing position of the power lever, explanatory of the functioning of the apparatus of FIG. 1; and FIG. 3 is a graph of the relation of the turbine r.p.m. with changing power lever position for both the high and low ground-idle modes of operation.

The apparatus illustrated in FIG. 1 employs by way of example alternating voltage type analog computing circuitry. The apparatus includes summing amplifiers and position servo mechanism, the functioning of which is explained in detail in Patent No. 2,798,308, for example. Briefly summarized, a summing amplifier delivers an output signal that represents the algebraic summation of the input signals applied thereto through respective summing and proportioning resistors. For simplicity of the disclosure, a summing amplifier is designated by SA enclosed, together with the variable that such summing amplifier computes, in a triangle, and the input resistors may be assumed to be contained within the summing amplifier proper.

A position servo includes a summing amplifier that energizes a control winding of a two-phase induction motor, whose other phase winding is energized by a constant reference voltage, that is 90° out of phase with a reference voltage +E encountered hereinafter. The signal voltages which actuate the summing amplifiers and servo amplifiers are either in phase with or in phase opposition to the reference voltage +E, as reflected by plus or minus signs respectively. There is also employed a further reference voltage —E, which is of like magnitude as, but of opposite phase to the reference voltage +E. The servo motors are bidirectional, the direction of rotation depending upon the net phase of the input signals applied to the servo amplifier. The velocity of rotation is in accordance with the magnitude of the net input signal. The servo motor drives a generator that provides a further input signal to the servo summing amplifier for velocity feedback purposes. The servo motor further drives through mechanical connections, including a gear reducer, one or more sliders of potentiometers. There is at least one potentiometer provided for each servo system for purposes of deriving an answer signal, which is applied as a further input to the servo summing amplifier.

The servo motor is actuated in response to non-zero net input signal and comes to a rest when the answer signal rebalances the net external signal.

In the interest of clarity the position servo system is designated by PS, enclosed with the particular variable that the servo motor shaft position represents, in a triangle. It is intended that this include the servo summing amplifier, the servo motor and velocity feedback generator. The answer and velocity feedback signals are not shown explicitly, and the summing resistors associated with the inputs to the servo summing amplifier may be assumed to be contained within the system designated by PS.

The potentiometers driven by the servo motors, and also by manual controls, e.g. the power lever 10, are suitably energized and contoured or connected to, or shunted in whole or in part by fixed resistors, to derive at their respective sliders specified mathematical functions. For clarity the potentiometers are indicated in plane development without regard to their actual contour.

Referring to FIG. 1, the power lever 10 is operable from the extreme counter-clockwise position of "full reverse," on a continuous basis, to the opposite, clockwise extreme, designated as T.O. (take-off). Intermediate positions are, in order, "reverse," "ground-idle," "taxi" and "flight-idle." The limit of the ground range is the taxi position, and the limit of the flight range is the flight-idle position. The nominally designated positions, of course correspond to the locations to which the power lever should be placed, to secure the required fuel flow, turbine inlet temperature, and ultimately turbine shaft horse power, torque and r.p.m., much in the same manner as in the aforesaid Lem patent.

The power lever, through the agency of mechanical connections indicated as at 12 operates a slider 14 of a "linear" potentiometer 16 (i.e. of uniform contour) that is energized at opposite ends by a voltage $-T_2$, and is provided with two intermediate tap points 18 and 20, corresponding to reverse and flight idle respectively. Tap points 18 and 20 are short-circuited together and returned through a resistor 22 to ground. The voltage $-T_2$ is variable in accordance with the like designated compressor inlet temperature. The manner of generation of this voltage is indicated in the aforesaid Lem patent. By virtue of the just described manner of energization, contouring and connection of the potentiometer 16, the slider 14 derives in its traverse from the lower end of the potentiometer to the tap point 18 an approximately parabolically decreasing voltage, thence a voltage that remains substantially constant at the potential of the tap points 18 and 20 up to tap point 20, and increases again parabolically and in similar fashion beyond tap point 18 up to the upper end of the potentiometer corresponding to take-off. The turbine r.p.m. generally follows the relation of voltage derived by slider 14 with changing power lever position at fixed $T_2$; this is reflected in FIG. 3 by the initial parabolically decreasing portion 24, followed by the substantially flat straight line portion 26, and terminated by the parabolically increasing portion 28, assuming that high ground-idle operation is selected. In the case of low ground-idle operation the curve 30 takes the place of the straight line segment 26.

The voltage derived at the slider 14 is applied as an input signal $-F/A$ (LEV) to a summing amplifier 32, which further receives an input $+F/A(T_2)$, which is energized by the voltage $+T_2$ that is equal and opposite to the above mentioned voltage $-T_2$, and as such also represents compressor inlet temperature.

The summing amplifier 32 computes the fuel-air ratio as "requested" or called for by the position of the power lever, as the algebraic summation of the two input signals applied thereto. It delivers over line 34 and the normally open (NO) contact 1 of an usually energized fuel relay 36 an input signal $-F/A$ (REQ) to a servo summing amplifier 38.

The fuel relay when energized as indicated represents a condition of fuel available to the engine, and upon de-energization signifies the condition of cut-off of fuel. The relay may be energized as shown in the aforesaid Lem patent. "Usualism" as used herein with reference to the state of energization of relays, connotes the condition of the relays as in normal flight, whereas "normalcy" refers to the state of the relay contacts were all sources of energization removed.

The fuel-air ratio position servo 38 receives over the NO contacts 2 and 3 of relay 36, two further inputs, $-(F/A$ REQ-F MAX/A), HI-LO-G.I. respectively, which for the time being may be assumed to be grounded. In the event of release of the relay 36, signifying cut-off of the fuel, the three inputs are grounded through respective normally closed (NC) contacts of the relay, causing the servo 38 to run down corresponding to a zero fuel air ratio. The servo 38 operates over the indicated range of fuel-air ratio of from 0 to 0.03. The servo gang-operates through mechanical connections indicated as at 40 the slider 42 of a linear potentiometer 44, that is grounded at its lower end, corresponding to zero fuel-air ratio, and is energized by the reference voltage $+E$ at its upper end corresponding to the maximum fuel-air ratio. The computed fuel-air ratio has significance and utility externally of the principal apparatus herein described; thus the voltage derived at the slider 42 serves as an input signal $T_5-T_2$ to a turbine inlet temperature ($T_5$) computing positioning servo 46.

The turbine inlet temperature computing servo 46 receives an additional input $+T_2$ and is energized by the like-named input voltage previously referred to. It operates between the indicated limits of $-50°$ C. and $+850°$ C., and drives through connections 50 a turbine inlet temperature indicator 52. The servo 46 provides suitable input signals to further computing systems in substantially the same manner as illustrated in the aforesaid Lem patent. These further computing systems, except for absence of temperature limiting effects, interact in substantially the same manner as in the Lem patent, form no part of the present invention, and therefore are not shown. It will be sufficient here to indicate the computing steps leading to turbine r.p.m. Specifically the servo 46 will actuate a shaft horse power computing servo, which in turn will actuate a torque computing servo. The latter, together with further computing systems illustrated and described in a co-pending application of Roscoe H. Goodwin, Serial No. 700,830 filed December 5, 1957, now Patent No. 2,979,833, dated April 18, 1961 will actuate a turbine r.p.m. servo, herein designated as 54.

Reverting to the consideration of the fuel flow computation and the associated limiting means, the fuel-air ratio voltage derived at the slider 42 is applied to the upper end of a linear potentiometer 55 that is grounded at its lower end and is provided with a slider 56 that is gang-operated via connections 58 by an air flow computing servo ($Wa$) designated by reference numeral 60. Thus the voltage derived by the slider 56 represents the product of the energizing potential (fuel-air ratio) and of the position of the air flow servo 60, in other words fuel flow ($Wf$).

The voltage derived from slider 56 is applied as an input signal $+Wf$ to a fuel flow computing servo 62 which operates between the indicated limits of zero and 6,000 lbs. per hour. The latter servo gang operates via connections 64 a fuel flow indicator 66 and a cam 68 which engages a moveable contact 70 which normally engages a fixed stop 72. Alternately, when the maximum or limiting fuel flow of approximately 3850 lbs. per hour is attained the cam 68 by means of the elevation 74 causes engagement of the moveable contact 70 with a cooperating fixed contact 76 to complete the energization circuit for a fuel flow limit relay 78 from the direct voltage $+Edc$, via contacts 70 and 76 through relay 78 to ground.

Thus it is seen that the output variable fuel-air ratio as represented by the position of the servo 38 or the voltage at slider 42 is normally the same as the primary input variable "fuel-air ratio requested" as delivered by the summing amplifier 32, whereas normally the output variable "fuel flow" as represented by the voltage derived at the slider 56 (or the position of servo 62) is normally the product of the primary variables "fuel-air ratio requested" and "air flow," the latter as represented by the position of the air flow servo 60. Means are provided to limit the fuel flow to the maximum of 3850 lbs. per hour where the requested fuel-air ratio, as determined principally by the power lever position, and secondarily by the compressor inlet temperature, is greater than that which would result in said maximum.

To the end of limiting the fuel flow, the output signal of the summing amplifier 32 is delivered additionally over branch line 34a as an input signal −F/A (REQ) to a summing amplifier 80 which compares this signal with a second input signal +F MAX/A, that is derived from a slider 82 of a linear potentiometer 84 that is energized at its lower end by the reference voltage +E, that is shunted by a fixed resistor 86, and that is connected at its upper end through a fixed resistor 88 to ground. The slider 82 is driven by the air flow computing servo 60 also by means of the connections 58. By reason of the manner of energization and auxiliary connections of the potentiometer 84 just mentioned, the voltage derived at the slider 82 represents the reciprocal of air flow $1/W_a$, and the reference voltage +E in this instance corresponds to the maximum or limiting fuel flow of 3850 lbs. per hour. The input voltage +F MAX/A thus provides a variable maximum fuel-air ratio signal which if remultiplied by the instant air flow as represented by the position of the servo 60 would ultimately provide the constant maximum fuel flow. This necessitates comparison of the maximum fuel-air ratio with the requested fuel-air ratio; this function is performed by the comparator 80. When the requested fuel-air ratio is less than the maximum fuel-air ratio, the net input signal to the amplifier 80, is positive; it is zero when the requested and maximum ratios are equal, and is negative when the requested fuel-air ratio exceeds the maximum fuel-air ratio. The output of signal amplifier 80 is in phase opposition to the net input signal applied thereto. It is within the scope of the invention to utilize the change of sense of the output signal of the amplifier 80, attendant to matching of requested and maximum fuel-air ratios, directly to change the control of the servo 38. However, in accordance with the most preferred embodiment of the invention, we propose to effect such change of control indirectly.

We have found that overshoots, oscillations and hunting may be avoided by letting the fuel flow servo 62, rather than the amplifier 80 exercise the most direct control for transfer of input signals to the servo amplifier 38 through the agency of the relay 78, when the primary input signals "requested fuel-air ratio" and "air flow" are such as to call for transfer of the fuel flow servo 62 from its computing range to its limiting range. Accordingly the output signal of amplifier 80 is applied through the indicated NO contact 1 of relay 78, and thence the NO contact 2 of relay 36 as the input −(F/A REQ-MAX/A).

The operation of the fuel flow limiter system may be understood with reference also to FIG. 2, wherein the fuel flow is plotted as a function of the power lever position with air flow as a parameter. The curve 90 illustrates the relation with a particular value of air flow $W_{a_1}$, and as such does not reach the limiting ordinate Wf MAX. The combination of amplifier 32 and servos 38 and 60 compute a signal at the slider 56 represented by the curve 90. Concurrently the combination, were it completed by energization of relay 78, of amplifier 80 and servos 38 and 60 would in effect compute a voltage at the slider 56, represented by curve 92 that is the mirror image of the curve 90. For another value of air flow $W_{a_2}$ represented by the curve 94, the limiting fuel flow value is exceeded. The curve 94 intersects its mirror image curve 96 at point 98 on the maximum fuel flow ordinate. In this instance the relay 78 is energized and the effect of the output signal of the amplifier 80 is to cancel the effect of amplifier 32 on the servo 38, so that the net fuel flow to the right of the point 98 is represented by the maximum fuel flow ordinate.

At the instant of matching of the output signals of the amplifiers 32 and 80, the relay 78 will be energized, so that the input −(F/A REQ-F MAX/A) will be transferred from the grounded NC contact 1 of relay 78 to its NO contact. At this instant the output signal of amplifier 80 is zero, as appears from previous considerations. The power lever may be further advanced to provide an output signal on line 34 calling for even greater fuel flow, as represented by the curve 94. At the same time the very same output signal is applied over line 34a to the amplifier 80 and has a contributory effect on servo 38, ultimately reflected by the curve 96 which exactly cancels the requested fuel-air ratio signal on line 34. This leaves +F MAX/A as a net signal applied to the servo 38, i.e. the output signal of amplifier 80 due to its input signal +F MAX/A. The latter includes a contribution due to air flow which is desired for the purpose of fuel-air ratio indication for example, but is undesired for the purpose of fuel flow indication. Accordingly the undesired contribution is cancelled by virtue of operation of the slider 56 by the air flow servo 60 to effect remultiplication by air flow as previously mentioned.

The required reversion of the servo 62 from its limiting range to its computing range is first sensed by the amplifier 80 by reason of the fact that its output signal reverts to zero, and then to a barely positive value. This reduces the net input to the fuel-air ratio servo 38 to a value barely below that required for maximum limited fuel flow. Accordingly the servo 62 causes the contacts 70 and 76 to disengage, releasing the relay 78 and grounding its NC contact 1 once more.

The air flow position servo 60 is energized by an input signal +Wa that is derived from the slider 100 of a linear potentiometer 102, the slider being driven by the turbine r.p.m. (N) position servo 54 via mechanical connections 104. The servo 54 operates between the indicated limits of zero and 15,000 r.p.m.; it may be energized as in the aforesaid Goodwin patent.

Potentiometer 102 is energized by a voltage $+\delta_2/\sqrt{\theta_2}$ at its upper end and is returned from its lower end through a resistor 106 to ground. It is provided with a tap point 108 that is short-circuited to the lower end. A resistor 110 shunts tap point 108 and the upper end of the potentiometer. The derivation of voltages $\delta_2\sqrt{\theta_2}$ and $\theta_2$ is shown in Patent No. 2,798,308, granted to Stern et al. on July 9, 1957. From these two voltages the voltage $\delta_2/\sqrt{_2}$ may be derived by well known division techniques, as for example that employed for generating the input voltage +F MAX/A to the summing amplifier 80. The variable $\delta_2$ represents relative pressure ratio $P_2/P_0$, where $P_2$ is compressor inlet pressure and $P_0$ is the reference pressure at sea level. Similarly the variable $\theta_2$ represents adiabatic temperature ratio $T_2/T_0$ where $T_0$ is the reference temperature at sea level. Therefore the variable $\delta_2\%\sqrt{\theta_2}$ is the ratio of the relative pressure ratio to the square root of the adiabatic temperature ratio.

The Wa signal derived at the slider 100 represents the produce of $\delta_2\%\sqrt{\theta_2}$ and a non-linear function of N. This non-linear function, by reason of the connections and manner of energization of potentiometer 102 just described, is derived as follows:

As the turbine r.p.m. increases from zero to a low value corresponding to the position of the tap point 108, the slider 100 will derive a substantially constant voltage up to tap point 108, and therebeyond an approximately parabolically varying voltage. It is to be noted that the air flow is variable principally as a function of turbine r.p.m., while the requested fuel-air ratio is variable principally as a function of the power lever position. Both air flow and requested fuel-air ratio are subject also to variations in compressor inlet temperature, and the former also to variations in compressor inlet pressure.

To the end of generating the high and low ground idle curves 26 and 30 of FIG. 3, there is provided a "memory"

or "latching" relay generally indicated by 112. The relay is provided with a "low ground-idle" winding 114 and a "high ground-idle" 116. The relay 112 admits of four possible combinations of conditions of energization:

(1) Winding 114 is energized and winding 116 is de-energized, in which case the moveable relay contact 120 will be aligned with winding 114, as though winding 116 were absent, that is, in engagement with stationary contact 120b;

(2) Winding 116 is energized and winding 114 is de-energized, in which case the contact 120 will be aligned with winding 116 as though winding 114 were absent, that is, in engagement with the alternate stationary contact 120a;

(3) Both windings 114 and 116 are deenergized, in which case the contact 120 will remain in the alignment that existed at the last previous energization of the windings 114 or 116, as the case may be, thus "remembering" the last preceding energization;

(4) Both windings 114 and 116 are energized, in which case the contact will be aligned with winding 116, which overrides the effect of winding 114.

The winding 116 is energized in the power lever range "flight idle-take-off" and in the power lever range "reverse-full reverse." This is accomplished by means of a pair of cams 122 and 124 that are gang operated by the power lever 10 via the connections 12. The cams engage moveable contacts 126 and 128 respectively, each of which is connected to the direct voltage source +Edc. Outside of the reverse-full reverse range, the contact 126 engages a stationary contact 130 that serves as a stop, but within this range the cam elevation 132 engages contact 126, in turn to cause engagement by the latter of an alternate stationary contact 134. This completes an energization circuit for winding 116 from the source +Edc via contacts 126 and 134 and lines 136 and 138 through the winding to ground.

Similarly, when outside the flight idle-take-off range, the contact 128 engages a stationary stop contact 140, but within this range the cam elevation 142 engages contact 128 to cause in turn engagement by the latter of an alternate stationary contact 144, again to energize the winding 116. In this case the energization circuit extends from the source +Edc via contacts 128 and 144, and line 138 through the winding to ground.

Whenever winding 116 is or has been last energized, a substantially zero voltage is routed from the slider 146 of a linear potentiometer 148 via the stationary contact 120a and contact 120 (corresponding to alignment with winding 116), line 150 and the NO contact 3 of relay 36 to the input ±HI–LO G.I. This voltage is exactly zero, if the slider 146 engages the grounded center tap of potentiometer 148, and is otherwise of relatively small magnitude in comparison with the other inputs to the servo 38 by reason of the manner of energization of potentiometer 148. The potentiometer 148 is connected at its upper and lower ends through like fixed resistors 151 and 153 to the reference voltages +E and −E respectively. Resistors 151 and 153 are relatively large in comparison to potentiometer 148. The potentiometer 148 is provided to simulate adjustment of the ground-idle r.p.m. To this end there is provided a ground idle r.p.m. trim control 152 operable by the student flight engineer to adjust via connections 154, the position of the slider 146.

It is to be noted that the relatively flat high ground-idle curve 26 is due to the manner of connection and energization of the power lever potentiometer 16 previously mentioned. To the end of arriving at the low ground-idle curve 30 there is provided a further, linear power lever potentiometer 156, that is grounded at both ends and also at tap points 158 and 160 which correspond to the limits of the ground-idle range, reverse and flight-idle respectively. A fixed resistor 162 is connected across the tap points 158 and 160, and the potentiometer is energized at a third tap point 164, which corresponds to the ground-idle position of the power lever. Potentiometer 156 is energized at tap point 164 by the reference voltage +E. The slider 166 of potentiometer 156 is connected, assuming that winding 114 is or was last energized, via the alternate fixed contact 120b and contact 120, ultimately to the input ±HI–LO G.I. of the servo 38. The signal derived from the slider 166 is inherently of positive reference phase while that applied to the other inputs of the servo 38 is of inherently negative reference phase. This phase relation is proper to effect reduced fuel-air ratio and therefore ultimately low ground idle r.p.m. The curve 30 is generated by virtue of the connections and manner of energization of the potentiometer 156 just described; in particular the curve reaches a minimum at the ground-idle position of the power lever by virtue of the application of the voltage +E at tap point 164.

To the end of achieving low ground-idle r.p.m., the student pilot will actuate a momentary push button type switch contact 168 that is connected to the voltage +Edc, to engage a cooperating stationary contact 170 thereby to complete the energization circuit for winding 114 to ground. It is not contemplated that he do so outside of the ground-idle range wherein winding 116 is energized; if this nevertheless happens, no harm is done because of the overriding effect of winding 116 previously described. If on the other hand he properly operates the button 168 within the ground-idle range, winding 114 will be energized momentarily. The contact 120 will engage the contact 120b and remain in such engagement even though the closure of contacts of 168 and 170 is momentary; this is due to the memory property of the relay. The turbine r.p.m. follows the power lever position as indicated by the curve 30 rather than the curve 26 (FIG. 3) until either "reverse" or "flight idle" is reached. If thereafter the power lever were positioned into the flight idle-take-off range or the reverse-full reverse range, winding 116 will be energized to transfer contact 120 to engagement with contact 120a. If subsequently the power lever were repositioned to the ground-idle range, the high ground-idle relations reflected by curve 26 will prevail.

It is to be noted that when power to the simulator is initially turned on, the state of the contact 120 will be random, so that either high ground-idle or low ground idle operation may result. This random condition duplicates one that exists in the actual aircraft. In the simulator as in the actual aircraft, the student is taught to operate the button 168 while on ground preparatory to take-off, as in due course. It is thus contemplated that prior to take-off low ground-idle operation be the rule. On the other hand on landing, the power lever will have been positioned into the reverse-full reverse range, so that as a rule high ground-idle operation will result.

It should be understood that the apparatus herein described forms but a part of a complete simulated engine system for turbo-propeller aircraft; the balance of such complete system may be as described in the aforesaid Lem patent. It is further to be understood that many modifications of the apparatus illustrated may be apparent to those skilled in the art, and it is intended that such modifications as fall within the spirit and scope of the appended claims be encompassed within the invention. For example, the relay 78 might well be omitted and the contacts 70, 72 and 76 be utilized directly to perform the switching function for the output of amplifier 80 at the contact 1 of relay 78. That is, the contact 1 for switching the amplifier output can if desired be operated directly by the Wf cam 68. The relay 78 has been included primarily for convenience in illustration. The operation of the cam 68 to perform the required transfer from the computing range to the limiting range and vice versa, with or without use of the relay 78, is particularly advantageous in the interest of elimination of overshoots and hunting, as previously pointed out. A further advantage of this arrangement is its simplicity, as compared to the usual type of phase-sensitive relay actuated directly by the summing amplifier 80, as previously suggested.

Thus it will be seen that we have provided a particularly simple and efficient limiter system of utility in the general computer art, as well as in the aircraft simulation art. We have further provided simple and efficient means for simulating alternate high and low ground-idle operation of an aircraft engine system.

What is claimed is:

1. A limiter for producing a first and a second output signal in ultimate response to a first and a second primary variable input signal, said limiter defined by a limiting range and by a computing range wherein said second output signal represents alternatively a predetermined fixed value in the limiting range and a variable function in the computing range of said first input signal independently of said second input signal, the first output signal in either range representing the quotient of said second output and input signals (being necessarily independent of said first signal in said limiting range), comprising: means producing a fixed signal corresponding to said fixed value; dividing means receiving as divisor and dividend input signals said fixed and second input signals and producing an output signal representing their quotient; comparison means receiving as input signals said quotient and first input signals and producing a comparison output signal, said comparison signal being subject to a change in sense when said primary input signals vary relative to each other so as to call for transfer from said limiting range to said computing range and vice versa; means for combining in said limiting range, in canceling relation to the contribution (in said comparison signal) due to said first input signal, said first input and comparison signals thereby to produce said first output signal; multiplying means receiving as multiplier and multiplicand signals said first output and second input signals and producing said second output signal as their product; and switching means responsive to said changes in sense for alternately switching said comparison signal out and in to said combining means as said primary input signals vary relative to each other so as to call for transfer from said limiting range to said computing range and vice versa.

2. A limiter for producing a first and a second output signal in ultimate response to a first and a second primary variable input signal, said limiter defined by a limiting range and by a computing range wherein said second output signal represents alternatively a predetermined fixed value in the limiting range and a variable function in the computing range of said first input signal independently of said second input signal, the first output signal in either range representing a joint function of said second output and input signals (being necessarily independent of said first signal in said limiting range), comprising: means producing a fixed signal corresponding to said fixed value; function generating means receiving as input signals said fixed and second input signals and producing an output signal representing a joint function of said fixed and second input signals; comparison means receiving as input signals the latter joint function signal and said first input signal, and producing a comparison output signal, said comparison signal being subject to a change in sense when said primary input signals vary relative to each other so as to call for transfer from said limiting range to said computing range and vice versa; means for combining in said limiting range, in canceling relation to the contribution (in said comparison signal) due to said first input signal, said first input and comparison signals thereby to produce said first output signal; second function generating means receiving as input signals said first ouptut and said second input signals and producing said second output signal as a joint function of said first output and second input signals, the latter being in cancelling relation to the contribution in the former due to the second input signal component in said comparison signal; and switching means responsive to said changes in sense for alternately switching said comparison signal out and in to said combining means as said primary input signals vary relative to each other so as to call for transfer from said limiting range to said computing range and vice versa.

3. A limiter for producing a first and a second output signal in ultimate response to a first and a second primary variable input signal, said limiter defined by a limiting range and by a computing range wherein said second output signal represents alternatively a predetermined fixed value in the limiting range and a variable function in the computing range of said first input signal independently of said second input signal, the first output signal in either range representing the quotient of said second output and input signals (being necessarily independent of said first signal in said limiting range), comprising: means producing a fixed potential signal corresponding to said fixed value; position servo means providing said second signal as determined by its position; dividing means driven by said servo means and energized by said fixed signal for producing signal potential representing the quotient of the values represented by said fixed and second input signals; first signal summing means receiving as input signals the latter quotient signal and said first input signal, and producing a comparison output signal, said comparison signal being subject to a change in sense when said primary input signals vary relative to each other so as to call for transfer from said limiting range to said computing range and vice versa; second signal summing means for combining in said limiting range, in canceling relation to the contribution (in said comparison signal) due to said first input signal, said first input and comparison signals thereby to produce said first output signal in the form of electrical potential; multiplying means driven by said servo means and energized by said first output signal for producing said second output signal in the form of signal potential as the product of the values represented by said first output and second input signals; and switching means responsive to said changes in sense for alternately switching said comparison signal out and in to said second summing means as said primary input signals vary relative to each other so as to call for transfer from said limiting range to said computing range and vice versa.

4. A limiter according to claim 1, wherein the switching means is responsive directly to the second output signal calling for transfer from the limiting range to the computing range and vice versa respectively to switch the comparison signal out and in.

5. A limiter according to claim 2, wherein the switching means is responsive directly to the second output signal calling for transfer from the limiting range to the computing range and vice versa respectively to switch the comparison signal out and in.

6. A limiter according to claim 3, wherein the switching means is responsive directly to the said second output signal calling for transfer from the limiting range to the computing range and vice versa respectively to switch the comparison signal out and in.

7. A limiter according to claim 6, further provided with second position servo means responsive to said second output signal for determining servo position, the switching means including cam-operated contact means driven by said second servo means for causing switching of the comparison signal out and in.

8. In apparatus for simulating the engine system of an aircraft having computing means for representing the airflow of said engine, the combination comprising a simulated power lever positionable by a student pilot over a range of positions corresponding to a range of engine operation; function generating means operatively connected with said power lever for providing a variable electrical signal in accordance with the power lever position, the latter signal representing requested fuel-air-ratio; function generating means receiving as input signal an output signal of said airflow computing means and in turn providing an output signal representing the ratio of a predetermined maximum fuel flow to the instant airflow; means for comparing said two fuel-air-ratio signals and providing a difference signal that is subject to a change in sense when said requested fuel-air-ratio signal calls for fuel flow greater than said maximum fuel-air-ratio signal and vice versa; computing means for representing actual fuel-air-ratio responsive to said difference signal and to said requested signal received as input signals by the last-mentioned computing means, said requested signal being applied to said last-named computing means in canceling relation to the requested signal component in said difference signal; means receiving as input signals, output signals of said actual fuel-air-ratio and airflow computing means for computing fuel flow and defined by a limiting range wherein the computed fuel flow is constant at said predetermined maximum independently of said requested fuel-air-ratio signal and by a computing range wherein the computed fuel flow is a variable function of said requested fuel-air-ratio and computed air flow; and switching means responsive to said changes in sense for alternately switching out and in said difference signal to said actual fuel-air-ratio computing means as said maximum fuel-air-ratio signal exceeds said requested fuel-air-ratio signal and vice versa, thereby effecting transfer from said limiting range to said computing range and to render said actual fuel-air-ratio alternately independent of said computed air flow and independent of said requested fuel-air-ratio respectively.

9. Apparatus according to claim 8, wherein the switching means is responsive directly to the transfer of the fuel flow computing means from the limiting range to the computing range and vice versa for respectively switching out and in the difference signal to the actual fuel-air-ratio computing means.

10. Apparatus according to claim 8 with the provision of a plurality of control signals representing ambient temperature and pressure and engine r.p.m., means for modifying the requested fuel-air-ratio signal in accordance with said ambient temperature, and the airflow computing means being responsive to signals representing said temperature, pressure and r.p.m.

11. Apparatus according to claim 8, wherein the power lever range includes a ground-idle range, provided with selector means operable in said ground-idle range by the student to select low ground-idle r.p.m. operation as an alternate to high ground-idle r.p.m. operation, a further function generating means associated with said power lever for producing in accordance with the position thereof a signal applicable on low ground-idle selection to the actual fuel-air-ratio computer and effective to reduce the actual fuel-air-ratio and fuel flow, and further switching means associated with said power lever for disconnecting at the limits of said ground-idle range the last mentioned signal, whereby upon subsequent traverse of said ground-idle range high ground idle operation results unless low ground-idle is selected once more.

12. Apparatus according to claim 11 wherein the selector means is of the momentary actuable type, with the inclusion of memory means responsive to actuation of said selector means in the low ground-idle range to continue application of the low ground-idle signal to the actual fuel-air-ratio computing means even though said actuation is discontinued and responsive to further operation of the switching means for maintaining discontinuance of such signal application even though said power lever reverts into the ground-idle range.

13. Apparatus according to claim 11, further provided with a simulated ground-idle r.p.m. trim control adjustable by a student, means providing a signal according to the adjusted position of said trim control, and means for applying the latter signal as an additional input signal to the actual fuel-air-ratio computing means in other than low ground-idle operation to modify the computed actual fuel-air-ratio and ultimately the fuel flow.

14. A limiter for producing first and second output signals representing respective conditions in response to first and second primary variable input signals, said first input signal representing a condition requested, comprising function generating means receiving said second input signal for producing, as a function of said second input signal, a signal representing a limiting value for said condition requested, comparison means receiving as input signals said condition requested and condition limited signals and providing a comparison output signal, a computer, means for switching the comparison signal either into or out of the computer input, said computer receiving as an additional input signal at all times the requested signal, and producing said first output signal to represent one of said respective conditions, function generating means receiving said second primary input signal, for cancelling from said first output signal independently of the condition requested signal, a function of said second primary input signal to produce the second output signal representing the other of said respective conditions, and means for controlling the aforesaid switching means according to a predetermined value of said second respective condition whereby the computer operates within a so-called limiting range when the compared signal is switched in, and within a so-called computing range when the compared signal is switched out.

References Cited in the file of this patent

UNITED STATES PATENTS

| | | |
|---|---|---|
| 2,784,501 | Stern et al. | Mar. 12, 1957 |
| 2,798,308 | Stern et al. | July 9, 1957 |
| 2,824,388 | Stern et al. | Feb. 25, 1958 |
| 2,882,615 | Dawson | Apr. 21, 1959 |

FOREIGN PATENTS

| | | |
|---|---|---|
| 804,206 | Great Britain | Nov. 12, 1958 |